United States Patent [19]

Stone-Elander et al.

[11] Patent Number: 5,308,944
[45] Date of Patent: May 3, 1994

[54] APPARATUS AND METHOD FOR MICROWAVE TREATMENT OF PROCESS LIQUIDS

[76] Inventors: Sharon A. Stone-Elander; Nils Elander, both of Västra Banvägen 23, S-182 46 Enebyberg, Sweden

[21] Appl. No.: 952,542
[22] PCT Filed: Jun. 12, 1991
[86] PCT No.: PCT/SE91/00426
   § 371 Date: Dec. 11, 1992
   § 102(e) Date: Dec. 11, 1992
[87] PCT Pub. No.: WO91/20169
   PCT Pub. Date: Dec. 26, 1991
   (Under 37 CFR 1.47)

[30] Foreign Application Priority Data

Jun. 14, 1990 [SE] Sweden .................. 9002117

[51] Int. Cl.$^5$ .............................. H05B 6/70
[52] U.S. Cl. .......................... 219/687; 219/750; 219/696; 219/693; 422/21
[58] Field of Search .......... 219/10.55 A, 10.55 R, 219/10.55 F, 10.55 E, 10.55 M; 422/21

[56] References Cited

U.S. PATENT DOCUMENTS

| | | | |
|---|---|---|---|
| 3,999,026 | 12/1976 | Boling | 219/10.55 A |
| 4,099,042 | 7/1978 | Jean et al. | 219/10.55 A |
| 4,207,452 | 6/1980 | Arai | 219/10.55 A |
| 4,269,581 | 5/1981 | Ury et al. | 219/10.55 F |
| 4,275,283 | 6/1981 | Focht | 219/10.55 F |
| 4,681,740 | 7/1987 | Commarmot et al. | 219/10.55 A |
| 4,714,812 | 12/1987 | Haagensen et al. | 219/10.55 A |
| 4,851,630 | 7/1989 | Smith | 219/10.55 A |
| 4,889,965 | 12/1989 | Gervais et al. | 219/10.55 M |

FOREIGN PATENT DOCUMENTS 2507408 2/1975 Fed. Rep. of Germany.

OTHER PUBLICATIONS

The Use of Microwave Ovens for Rapid Organic Synthesis, Gedye et al., Tetrahedron Letters, vol. 27, No. 3, pp. 279-282, 1986 Printed in Great Britain.
On-Line Production of $^{13}$N-Nitrogen Gas from a Solid Enriched C-Target and Its Application to $^{13}$N-Ammonia Synthesis Using Microwave Radiation, Ferrieri et al., Int. J. Appl. Radiat. Isot, vol. 34, No. 6 pp. 897-900, 1983, Printed in Great Britain.
Synthesis of F18-Fluorine Gas from No Carrier Added F18-HF, M. G. Straatmann, D. J. Schlyer, and J. Chasko. The Cyclotron Corporation, Journal of Labelled Compounds and Radiopharmaceuticals-vol. XIX, Nos. 11-12 p. 1373.
Production of No-Carrier-Added $^{11}$C-Carbon Disulfide and $^{11}$C-Hydrogen Cyanide by Microwave Discharge, Niisawa et al., Int J. Appl. Radiat, Isot. vol. 35, No. 1 pp. 29-33, 1984, Printed in Great Britain.
Application of Microwave Technology to the Synthesis of Short-Lived Radiopharmaceuticals, D. R. Hwang, S. M. Moerlein, L. Lang, and M. J. Welch J. Chem. Soc., Chem. Commun., 1987 pp. 1799-1801.
Application of Commercial Microwave Ovens to Organic Synthesis. Raymond J. Giguere, Terry L. Bray, and Scott M. Duncan, Tetrahedron Letters, vol. 27, No. 41, pp. 4945-4948, 1986 Printed in Great Britain.
Microwaves in Organic and Organometallic Synthesis, R. Gedye, F. Smith, and K. Westaway, International Microwave Power Institute Journal of Microwave Power and Electromagnetic Energy vol. 26, No. 1, 1991, pp. 3-17.

Primary Examiner—Philip H. Leung
Attorney, Agent, or Firm—Young & Thompson

[57] ABSTRACT

A microwave device for treating process liquids, preferably precursors to radiopharmaceuticals, with microwave radiation, with the intention of reducing reaction time and increasing reaction yield. The method and the device are characterized in that the geometry of the microwave cavity is varied proportionally to the geometry of the sample container in order to concentrate the microwave field within the container. The reaction time can also be shortened and the reaction yield also increased by varying the microwave field energy or microwave field frequency. The reaction time can also be decreased by adding salts to the process liquid or by adapting the frequency of the microwave field to the resonance frequency of the process liquid in the microwave spectrum.

12 Claims, 4 Drawing Sheets

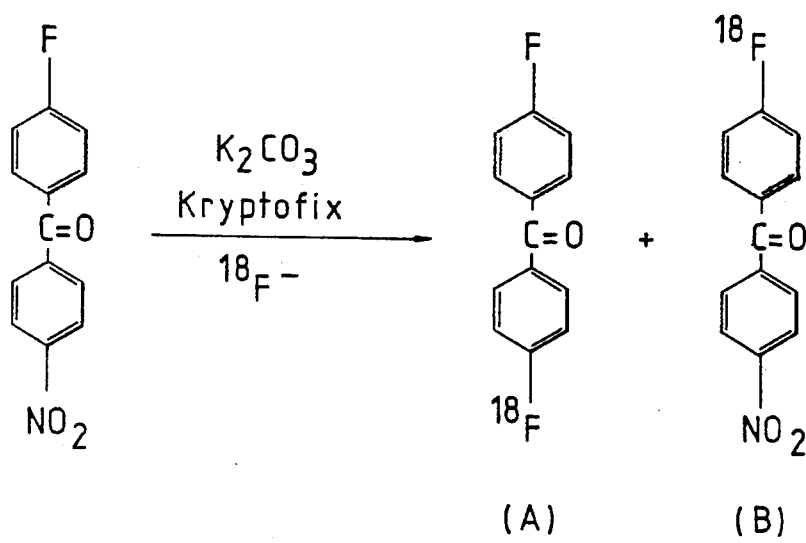
(A)  (B)  Fig. 6
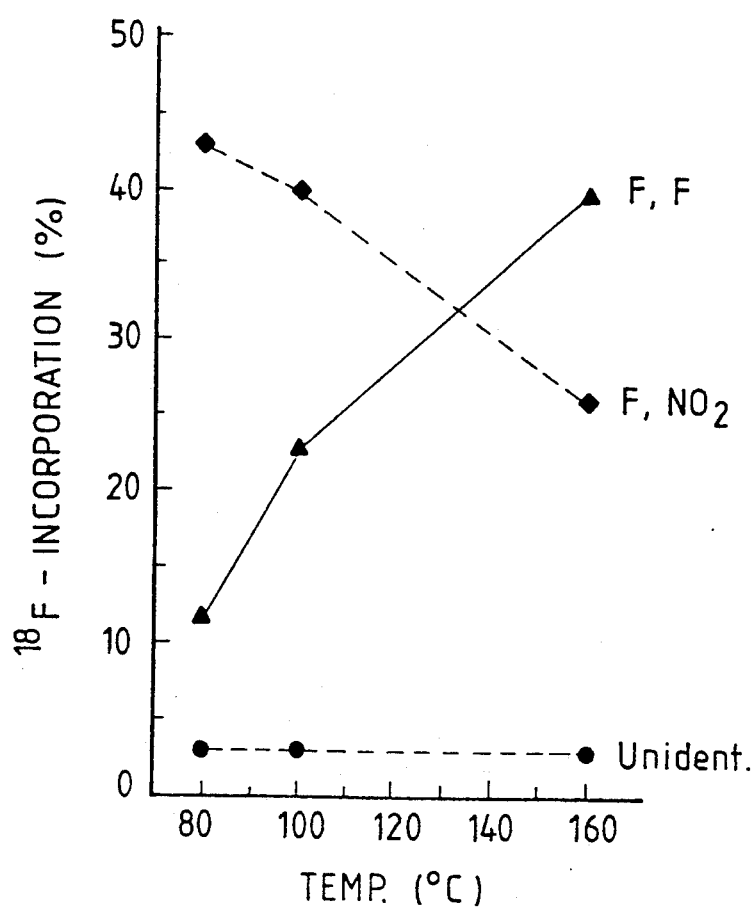
Fig. 7

APPARATUS AND METHOD FOR MICROWAVE TREATMENT OF PROCESS LIQUIDS

BACKGROUND OF THE INVENTION

1. Field of the Invention

The present invention relates to a microwave device intended for the treatment of process liquids, preferably the labelling of precursors to radiopharmaceuticals. The invention also relates to a method for treating process liquids, preferably when labelling precursors to radiopharmaceuticals with the aid of microwave radiation.

2. Description of the Prior Art

In certain cases, treatment with microwaves is able to increase drastically the rates of organic reactions. See in this respect R. Gedye et al, Tetrahedron Letters, 27 279 (1986). Microwaves have also been earlier used for the preparation of positron-emitting precursors that are intended for labelling purposes; see R.a. Ferrieri et al, Int. J. Appl. Radiat. Isot. 34 897 (1983). Microwaves have also been used in the preparation of radiopharmaceuticals labelled with $^{11}C$ and $^{18}F$. Such microwave treatment processes result in short reaction times and higher yields of the radio-labelled product. The microwave device used in the aforesaid liquid reactions is a conventional domestic microwave oven. An oven of this kind normally has a microwave frequency of 2450 MHz.

In the preparation of radiopharmaceuticals, there is used an accelerator for the preparation of radioactive isotopes which are formed into larger molecules in a subsequent radiochemical process and later administered to the patient, who is subsequently examined with a positron camera. The normal half-life of the isotopes is from 2 minutes to about 110 minutes. It will be realized that the radiochemical process must be capable of being carried out quickly, in view of the short half-life of the isotopes.

The microwave field can be described as a periodically reversed electromagnetic field. The electrons in the polar molecules follow the field direction and are placed in periodic motion, which in turn results in the generation of heat, among other things.

The drawbacks with the use of the aforesaid microwave oven when treating precursors to radiopharmaceuticals are that the microwave field cannot be adapted either to the type or to the quantity of the process liquid to be treated. The geometry of the oven is determined once and for all, and the microwave field can neither be concentrated nor varied with respect to strength and frequency.

SUMMARY OF THE INVENTION

The object of the present invention is to provide a method and a microwave device of the kind defined in the introduction which will enable a microwave cavity to be adapted geometrically to the amount and to the type of process liquid used, with the intention of shortening the process-liquid treatment time and of increasing the yield in which labelling substances are incorporated in a larger molecule.

This is achieved in accordance with the invention with the aid of a microwave device of the kind defined in the following claim 1 and with the aid of a method of the kind defined in the following claim 5.

BRIEF DESCRIPTION OF THE DRAWINGS

The invention will now be described in more detail with reference to the accompanying drawings, in which

FIG. 6 illustrates diagrammatically the reaction of $^{18}F$ with 4-nitro-4'-fluorobenzophenone;

FIG. 7 is a diagramme which illustrates the yield obtained when incorporating $^{18}F$ with the aid of conventional heating processes in the absence of microwave treatment;

DESCRIPTION OF THE PREFERRED EMBODIMENT

Figure 1:
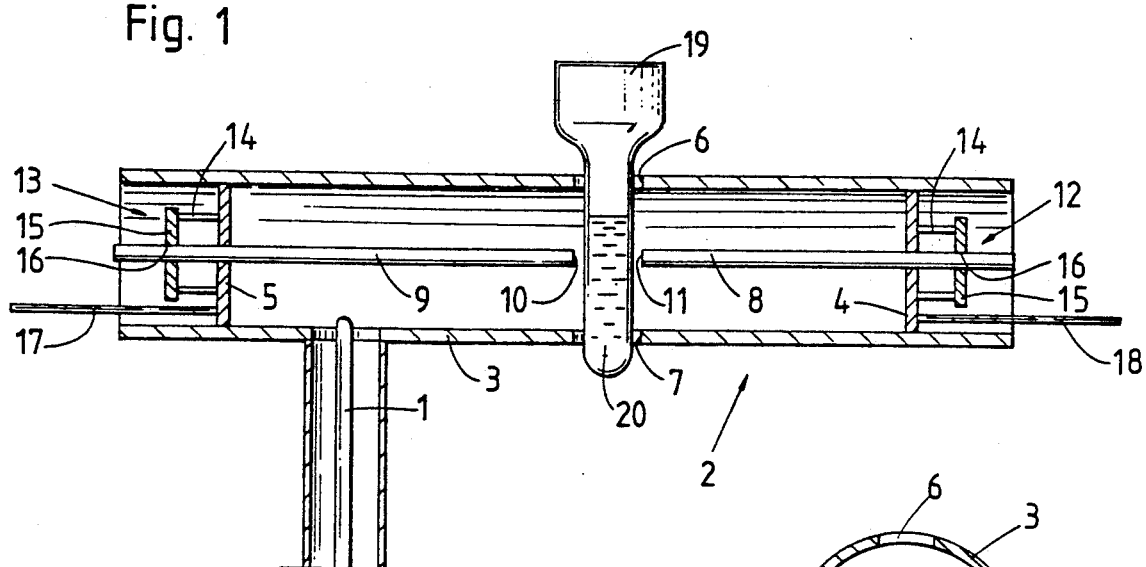
FIG. 1 illustrates schematically a microwave device constructed in accordance with the invention.

FIG. 1 illustrates a microwave device constructed in accordance with the present invention. The device includes an antenna 1 for radiating a microwave field. A microwave generator (not shown), which preferably has a variable power output, supplies the generated microwave signal through a coaxial cable connected to the antenna 1. The antenna 1 is illustrated purely schematically and may, for example, be of the horn type. The antenna is arranged in a microwave cavity 2 formed by a tube 3 having two end-walls 4 and 5. A first opening 6 penetrates the tube wall and is disposed substantially midway along the elongated tube. A second opening 7 is located opposite the first opening 6 and also penetrates the tube wall. Each of two coaxial bars 8, 9 extend from a respective end-wall inwardly towards the centre of the tube. Both of the bars are arranged centrally within the tube and present two mutually opposing end surfaces 10, 11. Each of the bars extends through a respective end-wall and is carried for axial movement by a respective holder device 12, 13. Each holder device includes a plurality of spacers in the form of rods 14 which are arranged concentrically at the end-wall and which are anchored to respective end-walls 4, 5. The rods 14 carry a plate 15 which is provided with an opening 16 in which respective bars 7, 8 are mounted for axial movement. The end-walls 4, 5, which define the resonance chamber in the cavity, are mounted for axial movement in the tube 3 and the position of respective end-walls can be adjusted by manipulating a respective, schematically illustrated setting rods 17 and 18. The length of the cavity, i.e. the distance between the end-walls 4, 5 is related to the wavelength of the microwave field, in a known manner.

A schematically illustrated sample container 19 filled with process liquid 20 to be treated with microwave radiation is inserted through the openings 6, 7. Before inserting the container, the positions of the bars 8, 9 are adjusted so that the microwave field will be concentrated on the process liquid 20, this adjustment being contingent on the geometry of the container 19. The end surfaces 10, 11 of the bars must not be placed so close to the container so as to cause electric sparking between the end surfaces. Neither should the energy of the microwave field be so high as to result in electric sparking.

When microwave energy is delivered through the antenna, the process liquid 20 is subjected to the microwave field concentrated by the bars 8, 9. Treatment time will vary according to the type of liquid concerned and the quantity of said liquid.

The microwave container 19 shall be made of a non-metallic material which will not be polarized by the microwave field. Quartz is a preferred material, in this respect, although Teflon or Pyrex can also be used.

Applicant has found that the liquid treatment time can be shortened and the yield of the chemical reaction in said liquid can be increased by adjusting the distance between the mutually opposing end surfaces 10, 11 of the bars proportionally to the geometric shape of the container 19 located between said end surfaces, in other words by varying the geometry of the microwave cavity 2. When the quantity of liquid 20 is decreased and the mutual spacing of the bars is also decreased to a corresponding extent, the reaction time is shortened and the yield produced by said chemical reaction is increased in comparison to the case when a larger volume of process liquid and a correspondingly larger mutual distance between the end surfaces 10, 11 is used.

Figure 2:
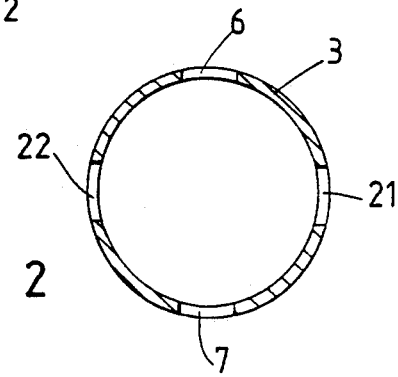
FIG. 2 is a cross-sectional view of an alternative embodiment of the microwave cavity of the microwave device.

FIG. 2 illustrates a preferred embodiment of the microwave cavity in the area of the openings 6, 7. Two openings 21, 22 are provided opposite one another in the tube wall. The openings 21, 22 are displaced through an angle of 90° in relation to the openings 6, 7, as shown in FIG. 2.

In addition to varying the geometry of the microwave cavity with the intention of shortening the reaction times and increasing the reaction yield, the intensity of the microwave field can also be varied. This intensity, i.e. the field strength, may not be increased to unpermitted values at which electric sparking will occur between the bars 8, 9 or at which the process liquid will be destroyed.

The reaction time can also be shortened and the reaction yield also increased by adding salts to the process liquid with the intention of increasing the number of ions in the process liquid, therewith also increasing the dielectric constant of the liquid and improving the correlationship between the alternating microwave field and the movement of the molecules in the process liquid.

It is also possible to adapt the frequency of the microwave field to the resonance frequency of the process liquid in the microwave spectrum. When the frequency of the microwave field is changed, it is necessary to change the dimensions of the microwave cavity, by axially displacing the end-walls 4, 5 with the aid of the setting rods 17, 18.

Figure 3:
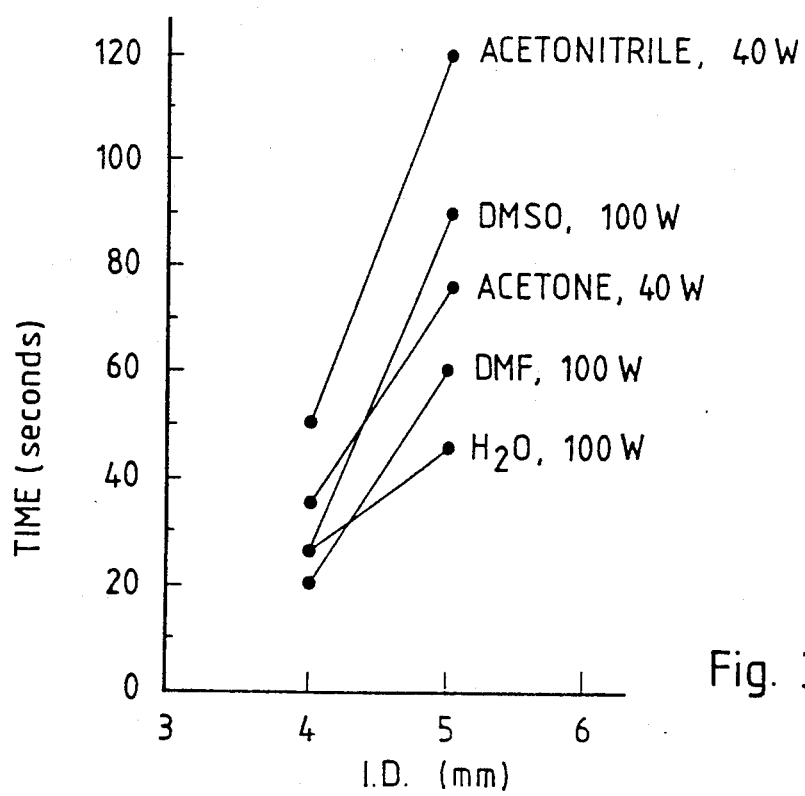
FIG. 3 is a diagramme which illustrates the effect of the microwave cavity geometry on solvent boiling times.

FIG. 3 illustrates the effect obtained when reducing the internal diameter of the container from 5 mm to 4 mm, resulting in a greatly reduced boiling time for different solvents at fixed field strengths.

Figure 4:
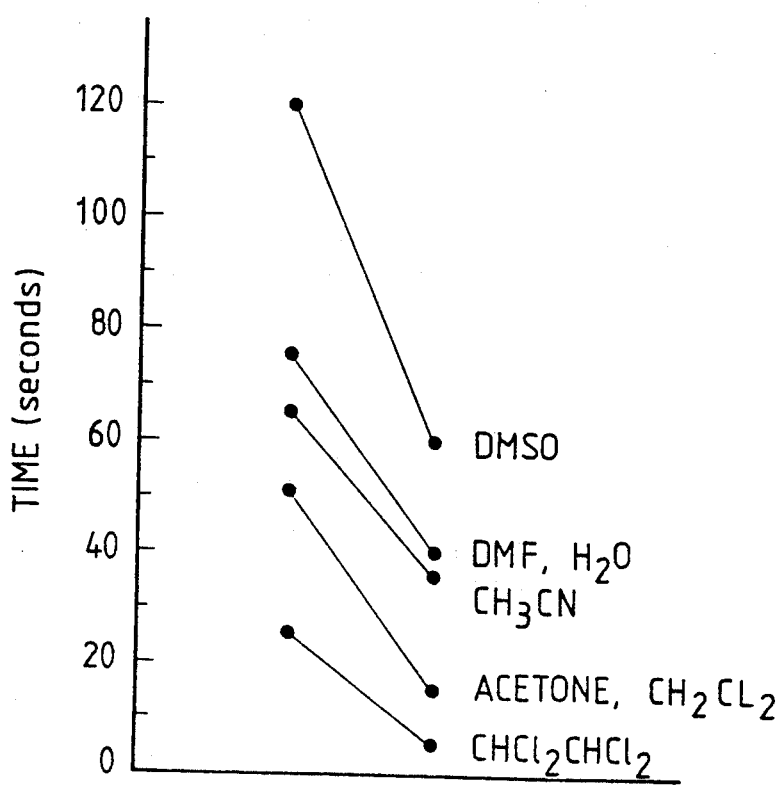
FIG. 4 is a diagramme which illustrates the effect of using salt in the process liquid to reduce the boiling time of different solvents.

FIG. 4 illustrates the reduction in solvent boiling times when salt is added to the solvents.

Figure 5:
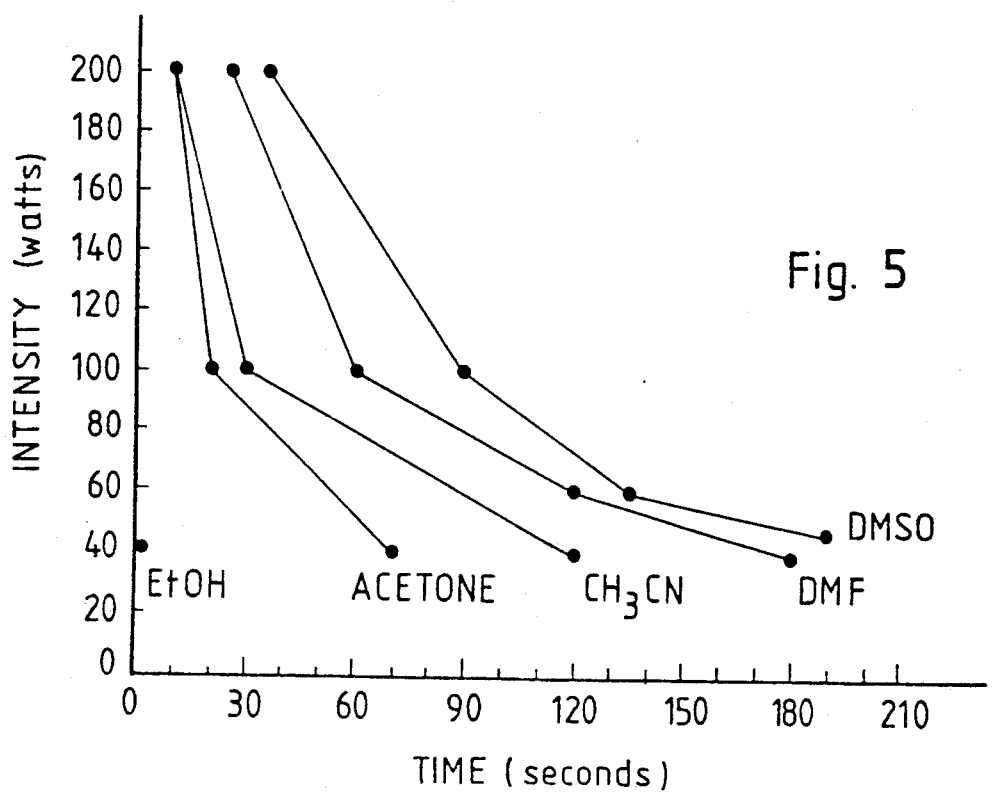
FIG. 5 is a diagramme which illustrates the relationship between the intensity of the microwave field and the boiling time of given, different solvents with a given microwave cavity geometry.

FIG. 5 illustrates the correlationship between microwave intensity and the boiling time of different solvents with a microwave cavity and container of predetermined geometry.

FIG. 6 illustrates the reaction of $^{18}F$ with 4-nitro-4'-fluorobenzophenone. FIG. 6 also illustrates the $^{18}F$-incorporation, expressed in percent, obtained in the reaction according to FIG. 6 with conventional heating processes. It will be seen that heat treatment is continued for at least 30 minutes, resulting in a yield of about 40%. FIG. 7 illustrates a reaction carried out in the inventive microwave device at a microwave energy of 35 watts. It will be seen that a yield of about 25% is obtained after only 2 minutes.

Figure 9:
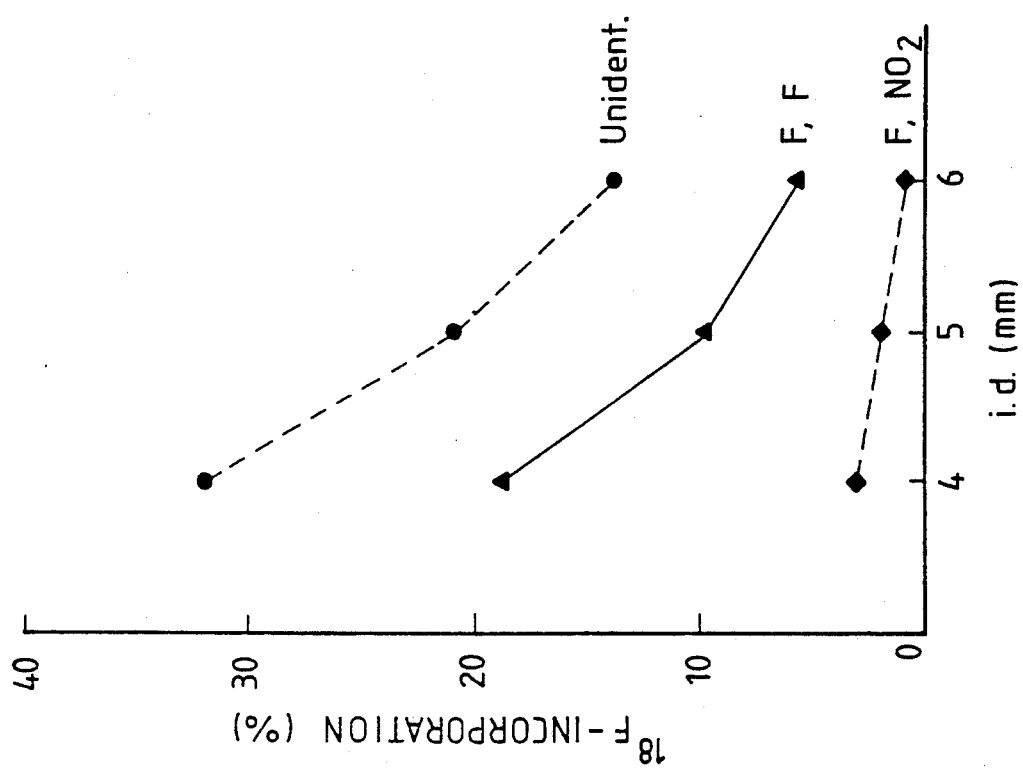
FIG. 9 is finally a diagramme which illustrates the effect of the microwave cavity geometry on the incorporation of $^{18}F$ in the reaction shown in FIG. 6.
Figure 8:
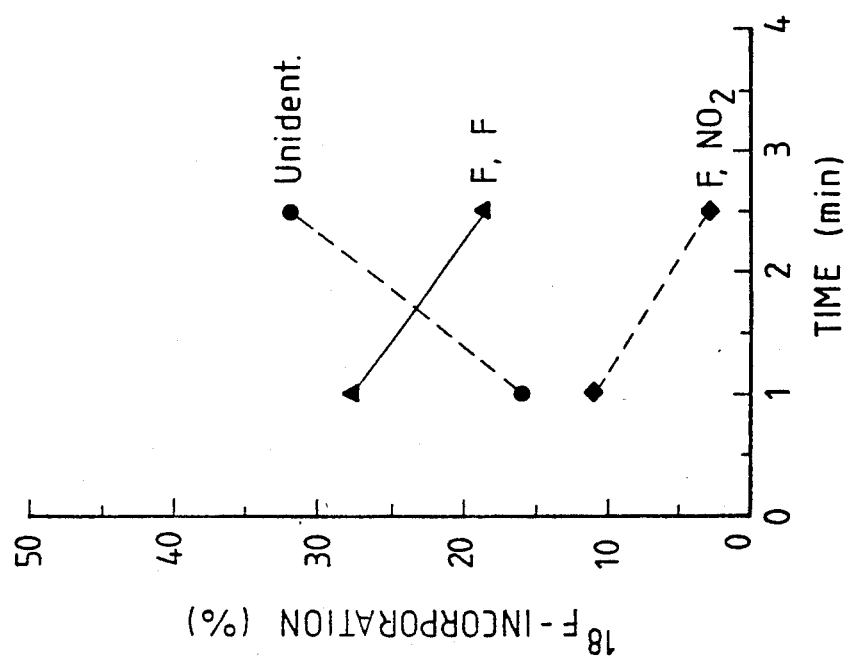
FIG. 8 is a diagramme corresponding to the diagramme of FIG. 7 and illustrating the use of microwave treatment in a microwave device constructed in accordance with the invention.

Finally, FIG. 9 illustrates how incorporation of $^{18}F$ is influenced by the geometry of the container and the geometry of the microwave cavity. For example, the incorporation of F, F increases from about 8% in the case of a tube diameter of 6 mm, to about 20% in the case of a tube diameter of 4 mm, when the sample is subjected in both instances to a microwave power of 35 watts for 2.5 minutes. It will be seen from FIGS. 8 and 9 that it is not only the total incorporation of the products (A) and (B) in FIG. 6 that is influenced by the geometry and field strength respectively, but also the distribution of the products. Furthermore, it is not only the polarity of the solvent in the reaction that is affected by the rapidly varying electromagnetic field, but also the distance between the counter-ions in the cryptofix-potassium carbonate fluoride complex varies with the rapidly varying electromagnetic field, which increases the reaction tendency of the ion reagent.

It will be understood that the invention can be modified and varied within the scope of the following Claims. For example, the microwave field can be concentrated with the aid of lenses.

We claim:

1. A microwave device for treating process liquids, comprising
an elongated microwave cavity which is formed by a tube having a tubular wall and two opposing end-walls;
means coupled to said two opposing end walls for moving said two opposing end walls along a longitudinal axis of said tube;
an antenna for radiating a microwave field, said antenna extending into said elongated microwave cavity between said two opposing end walls;
a first opening and an opposite second opening each of which perforate the tubular wall and each of which is located above midway between one end of said tubular wall and an opposite end of said tubular wall;
two coaxial bars, each coaxial bar extending through a respective end-wall towards the center of the tube, said two coaxial bars being disposed centrally in the tube and having two mutually facing end surfaces,
a sample container which is intended to be filled with process liquid and to be inserted in said first opening and said opposite second opening to subject said process liquid to the influence of the microwave field in said elongated microwave cavity; and
means for adjusting the distance between said mutually facing end surfaces of said two coaxial bars to concentrate said microwave field within said sample container.

2. A device according to claim 1, characterized in that the sample container is made from a non-metallic material which will not be polarized by the microwave field.

3. A device according to claim 2, characterized in that the material is quartz.

4. A device according to claim 2, characterized in that the material is glass which is resistant to heat, chemicals and electricity.

5. A device according to claim 2, characterized in that the material is a synthetic resin polymer containing fluorine.

6. A device according to claim 1, characterized by third openings which are located opposite one another and penetrate said tubular wall and which are displaced through an angle of 90° in relation to the first opening and the second opening.

7. A method for treating process liquids with microwave radiation, comprising the steps of
introducing process liquid into a sample container;
introducing the sample container into an elongated microwave cavity between mutually opposing end surfaces of two bars extending within said microwave cavity with the intention of polarizing the molecules of said liquid and of heating said liquid, said elongated microwave cavity being formed by a tube having a tubular wall and two opposing end walls, and said two bars comprising two coaxial bars, each coaxial bar extending through a respective end wall towards the center of the tube, said two coaxial bars being disposed centrally in the tube and having two mutually facing end surfaces;
radiating a microwave field within said elongated microwave cavity by means of an antenna which extends into said elongated microwave cavity between said two opposing end walls; and
varying the distance between said mutually opposing end surfaces, by means coupled to said two opposing end walls for moving said two opposing end walls along a longitudinal axis of said tube, to concentrate said microwave field within said sample container.

8. A method according to claim 7, characterized in that the sample volume of the container (19) is maintained small so as to increase the reactivity of the process liquid at a given field strength of the microwave field.

9. A method according to claim 7, characterized by varying the field strength of the microwave field with the intention of increasing reactivity of the process liquid at a given volume of process liquid.

10. A method according to claim 7, characterized by adding salts to the process liquid with the intention of increasing the dielectric constant of the liquid.

11. A method according to claim 7, characterized by adapting the frequency of the microwave field to the resonance frequency of the process liquid in the microwave spectrum.

12. A method according to claim 7, characterized by varying the field strength of the microwave field with the intention of increasing reactivity of the process liquid at a given volume of process liquid.

* * * * *